(12) United States Patent
Länsiö et al.

(10) Patent No.: US 7,376,108 B2
(45) Date of Patent: May 20, 2008

(54) DATA TRANSMISSION METHOD AND DATA TRANSMISSION ARRANGEMENT

(75) Inventors: Jari Länsiö, Tampere (FI); Lauri Piikivi, Oulu (FI)

(73) Assignee: Nokia Corporation, Espoo, FL (US)

( * ) Notice: Subject to any disclaimer, the term of this patent is extended or adjusted under 35 U.S.C. 154(b) by 938 days.

(21) Appl. No.: 10/162,039

(22) Filed: Jun. 3, 2002

(65) Prior Publication Data

US 2003/0007474 A1    Jan. 9, 2003

(30) Foreign Application Priority Data

Jun. 12, 2001    (FI) ................................. 20011239

(51) Int. Cl.
*H04Q 7/24* (2006.01)
*G06F 15/16* (2006.01)
*H04B 7/216* (2006.01)

(52) U.S. Cl. .................. 370/338; 370/328; 709/203; 709/217

(58) Field of Classification Search ................ 370/326, 370/328, 338, 346, 401, 449, 465–469; 709/203, 709/217, 227, 230, 249, 250, 219, 223, 225
See application file for complete search history.

(56) References Cited

U.S. PATENT DOCUMENTS

| | | | |
|---|---|---|---|
| 6,356,930 B2 * | 3/2002 | Garg | ........................ 709/201 |
| 6,549,773 B1 * | 4/2003 | Linden et al. | ........... 455/426.1 |
| 6,751,677 B1 * | 6/2004 | Ilnicki et al. | ............... 719/316 |
| 6,990,511 B2 * | 1/2006 | Ferwerda et al. | ........... 709/201 |
| 2002/0013827 A1 * | 1/2002 | Edstrom et al. | ............ 709/219 |

FOREIGN PATENT DOCUMENTS

EP    0817027 A3    1/1998

OTHER PUBLICATIONS

"Towards a Generic Architecture for Mobile Object-Oriented Applications", Haahr et al., Workshop on Service Portability, 2000.

* cited by examiner

Primary Examiner—Wing F. Chan
Assistant Examiner—Saba Tsegaye
(74) Attorney, Agent, or Firm—Perman & Green, LLP

(57) ABSTRACT

The invention relates to an arrangement for implementing data transmission between at least two sets of software used in one or more devices. The devices are capable of establishing a connection to a data transmission system. The communication between the devices takes place using service requests that include information on an address of a service provider. A name server of the arrangement maintains a list of sets of software providing and needing different services and their addresses. The name servers are arranged to search the data transmission system for other name servers and to exchange information concerning the sets of software needing a service and providing a service when they find a new name server.

34 Claims, 6 Drawing Sheets

DATA TRANSMISSION METHOD AND DATA TRANSMISSION ARRANGEMENT

FIELD OF THE INVENTION

The invention relates to a data transmission method and a data transmission arrangement wherein data is transmitted between two or more systems. The invention particularly relates to systems wherein data is transmitted between sets of software in different devices.

BACKGROUND OF THE INVENTION

In designing and maintaining information systems, attention has been paid to the establishment and smooth operation of connections between different systems. Separately located systems have often been implemented using rather many different methods and incompatible hardware of different type. It has been laborious and time-consuming, if at all possible, to convert the different systems into compatible ones.

Consequently, many different hardware and system manufacturers have developed a common architecture called CORBA (Common Object Request Broker Architecture) to enable different computer systems implemented using different programming languages to communicate with each other in a flexible manner. The CORBA specifies a GIOP (General Inter-ORB Protocol) protocol, and application of this protocol enables devices of different type and programs programmed in different programming languages to communicate. The GIOP protocol is a common protocol, from which an IIOP (Internet Inter-ORB Protocol) is has been developed particularly for the Internet environment. Further information on the CORBA can be obtained e.g. from a specification called The Common Object Request Broker: Architecture And Specification., Revision 2.0, published by OMG (Object Management Group), a group which created the architecture. The specification can also be found at www.omg.org.

The CORBA has been developed for systems that are fixedly interconnected through an unspecified network. When the protocol was being designed, little attention was paid to transmission path capacity and to the possibly changing transmission paths, the main focus being the creation of a safe and flexible protocol. Since wireless communication has recently become increasingly popular, computers and devices whose only or main connection to other networks is a wireless network, such as a GSM, GPRS or UMTS, have also started using information systems and different software.

Figure 1:
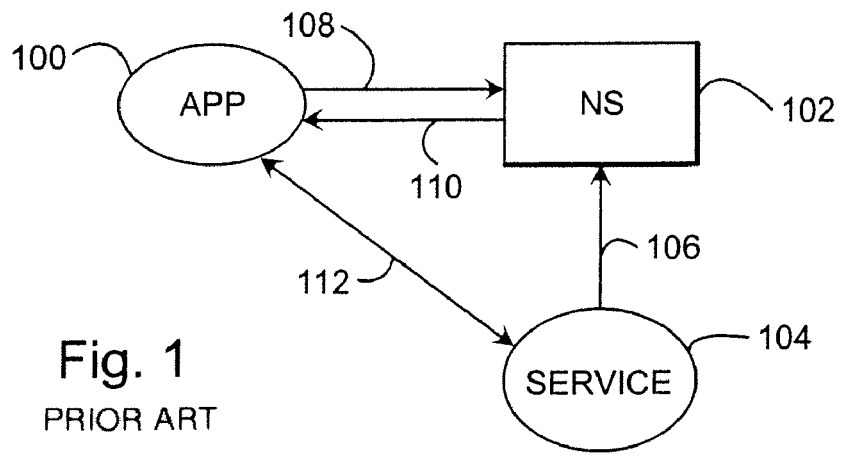

Examine a simplified example of the CORBA architecture of FIG. 1. The figure shows software or an application 100 and a name server 102. A name server is typically a server implemented by a computer and software, into which applications providing different services can register. In the example of FIG. 1, an application 104 providing a service is registered in the name server. Physically, an application is typically software arranged in computer hardware. When the application registers in the name server, it indicates its address, i.e. how the application can be accessed. The name server maintains a list of software items providing different services, including the addresses. When the software 100 needs a service, it establishes a connection 108 to the name server 102 and indicates that it needs a particular service. The name server searches its list for such a service and replies by issuing the address of the application providing the desired service. Next, the software may transmit a service request 112 to the application 104 providing the service.

A special feature of the wireless telecommunication systems in particular is that the devices in a system can usually be readily moved. Hence, e.g. when wireless local area networks are used, a terminal may be switched over to be controlled by another local area network. The immediate network environment of the terminal thus changes. The applications of the terminal cannot thus know e.g. the services provided by the name server since the nearest name server has changed. Similar problems may also be presented by systems using wired connections, which, however, allow the devices to be moved from one place to another. As was stated above, the CORBA was originally developed for systems that did not take mobility into account. Consequently, problems caused by mobility have been ignored while designing the method. When the network environment of the devices changes, it is essential that the operation of the devices continues as easy and as flexible as possible.

BRIEF DESCRIPTION OF THE INVENTION

An object of the invention is thus to provide a method and an arrangement implementing the method so as to make using mobile devices less problematic regardless of changes in the network conditions. This is achieved by a method for implementing data transmission between at least two sets of software used in one or more devices, at least some of the devices being capable of establishing a connection to a telecommunication system, in which method at least some of the communication between the sets of software is implemented using service requests that include information on an address of a service provider, sets of software providing different services are registered in name servers, a list of the sets of software providing different services and their addresses is maintained in the name servers, and in which method sets of software needing different services are registered in the name servers, a list of the sets of software needing different services and their addresses is maintained in the name servers, the name servers search a data transmission system for other name servers and exchange information concerning the sets of software needing a service and providing a service when the name servers find a new name server.

The invention also relates to an arrangement for implementing data transmission between at least two sets of software used in one or more devices, at least some of the devices including means for establishing a connection to a data transmission system, in which arrangement at least some of the communication between the devices is arranged to take place by means of service requests that include information on an address of a service provider, and which arrangement includes one or more name servers arranged to maintain a list of sets of software providing different services and their addresses, and in which arrangement the sets of software providing different services are arranged to be registered in the name servers.

The arrangement of the invention includes one or more name servers arranged to maintain a list of sets of software needing different services and their addresses, and the sets of software needing different services are arranged to be registered in the name servers, and the name servers are arranged to search the data transmission system for other name servers and to exchange information concerning the sets of software needing a service and providing a service when the name servers find a new name server.

Preferred embodiments of the invention are disclosed in the dependent claims.

The invention can be applied particularly when using the CORBA protocol in wireless telecommunication devices, but the invention can also be applied to other systems utilizing addressed messages and solutions of the name server type. In the preferred embodiments of the invention, both the sets of software providing services and the sets of software desiring services can be registered in the name servers. In some preferred embodiments of the invention, wireless terminals include a name server of their own. Every now and then, the name servers poll their environment to detect new name servers in a possibly changed environment. Having detected a new name server, the name servers intercommunicate, exchanging information on the sets of software registered in the name servers.

The method and arrangement of the preferred embodiments of the invention provide several advantages. The invention makes the communication between mobile devices and surrounding local area networks more flexible, and services provided by the networks easier to be utilized by a user of the devices.

BRIEF DESCRIPTION OF THE INVENTION

Figure 4:
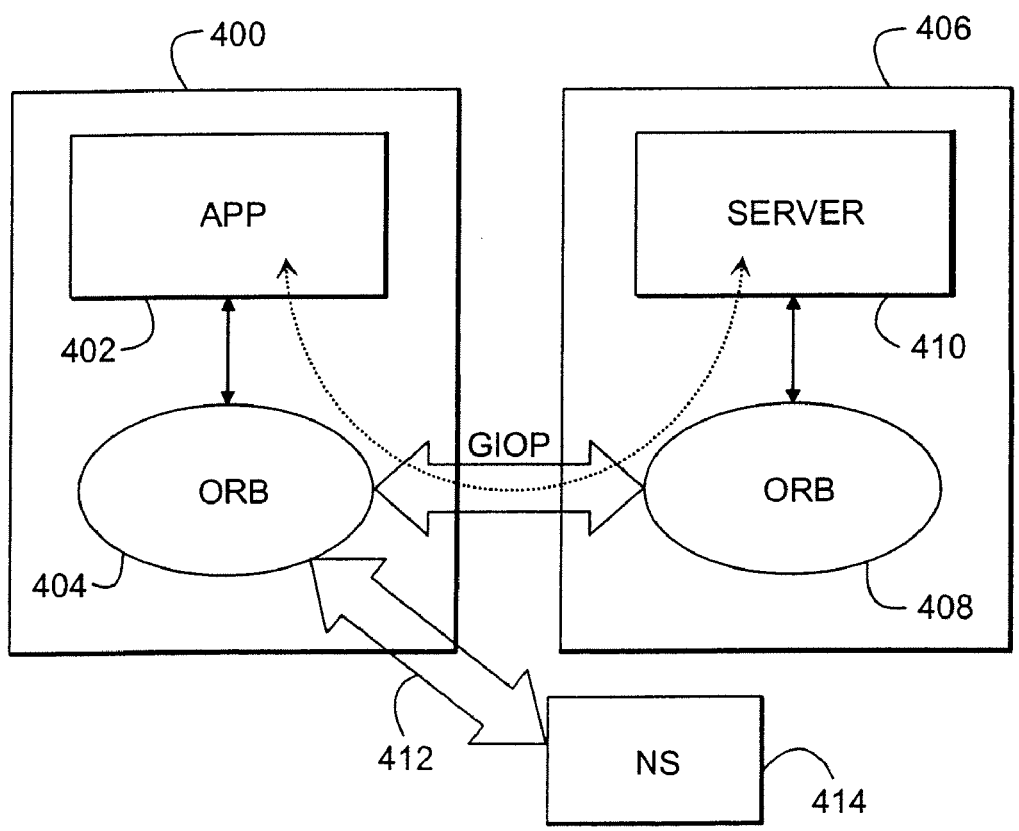
Figure 2:
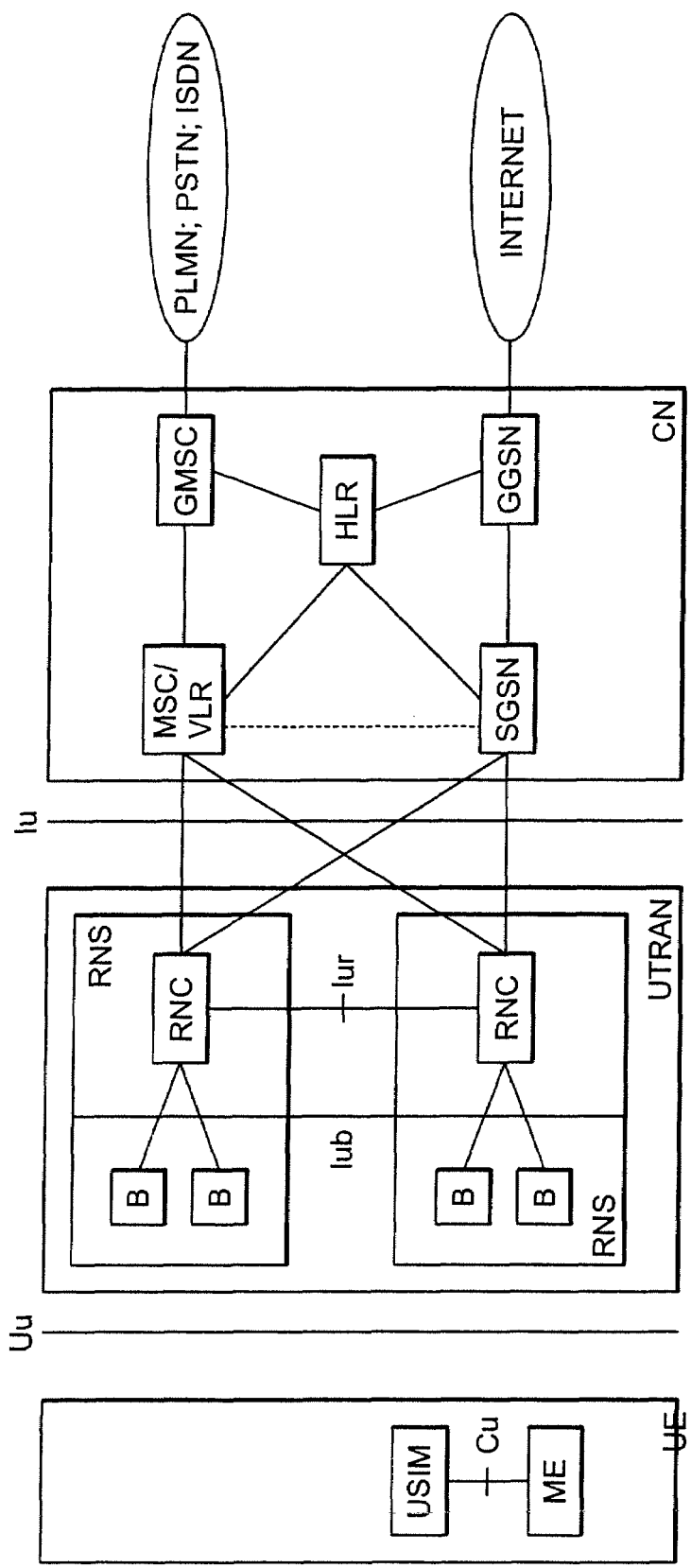
Figure 3:
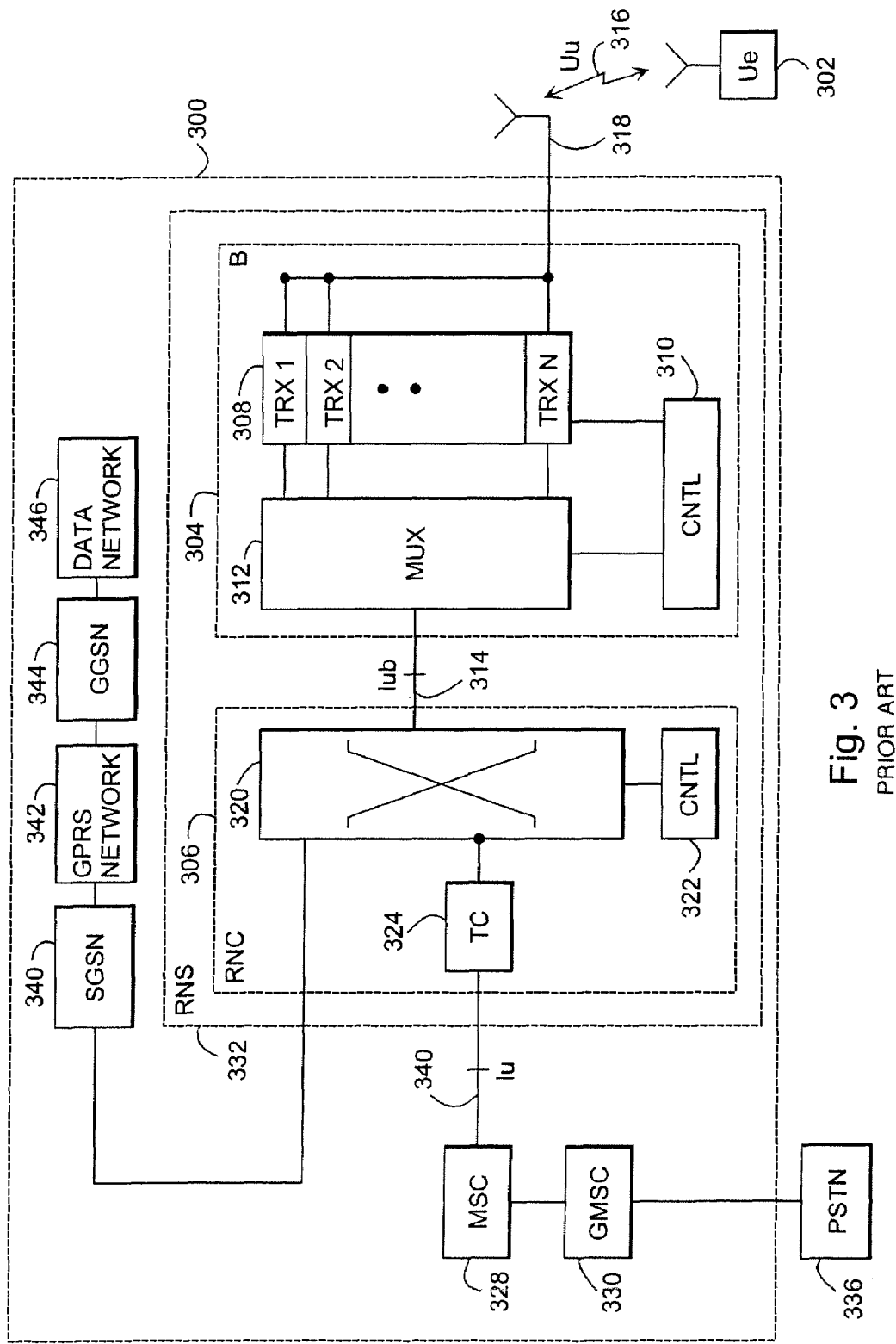
Figure 5B:
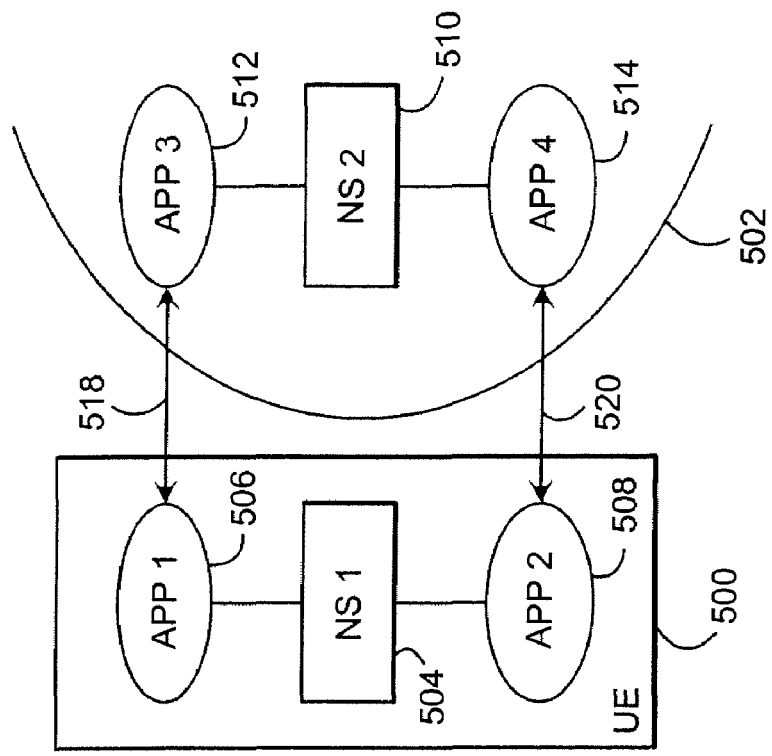
Figure 5A:
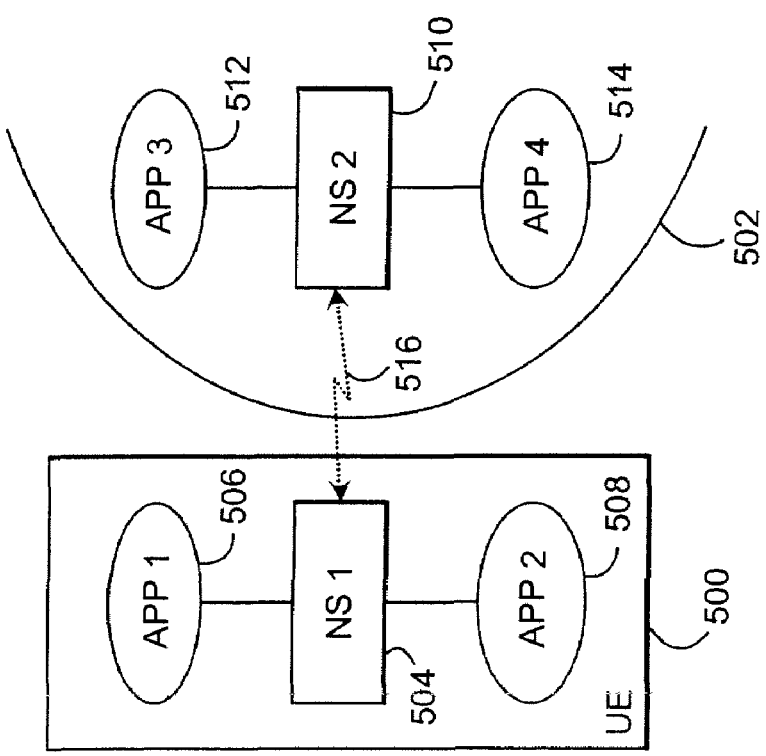
Figure 8:
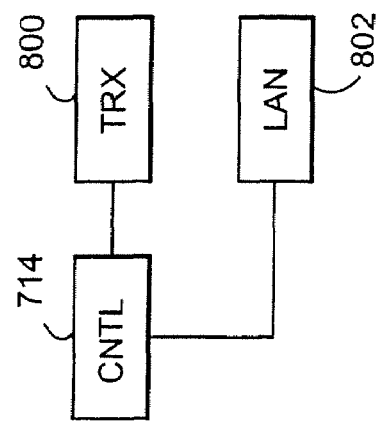
Figure 6:
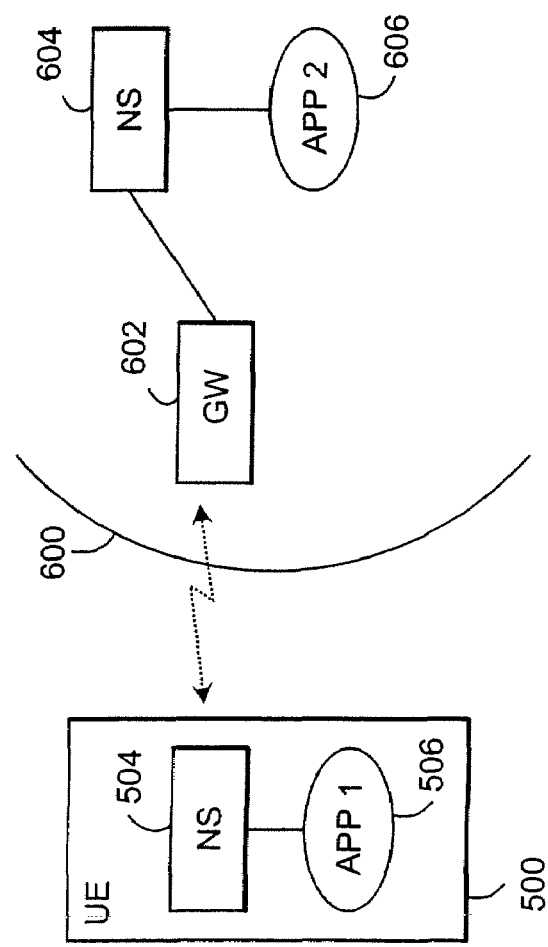
Figure 7:
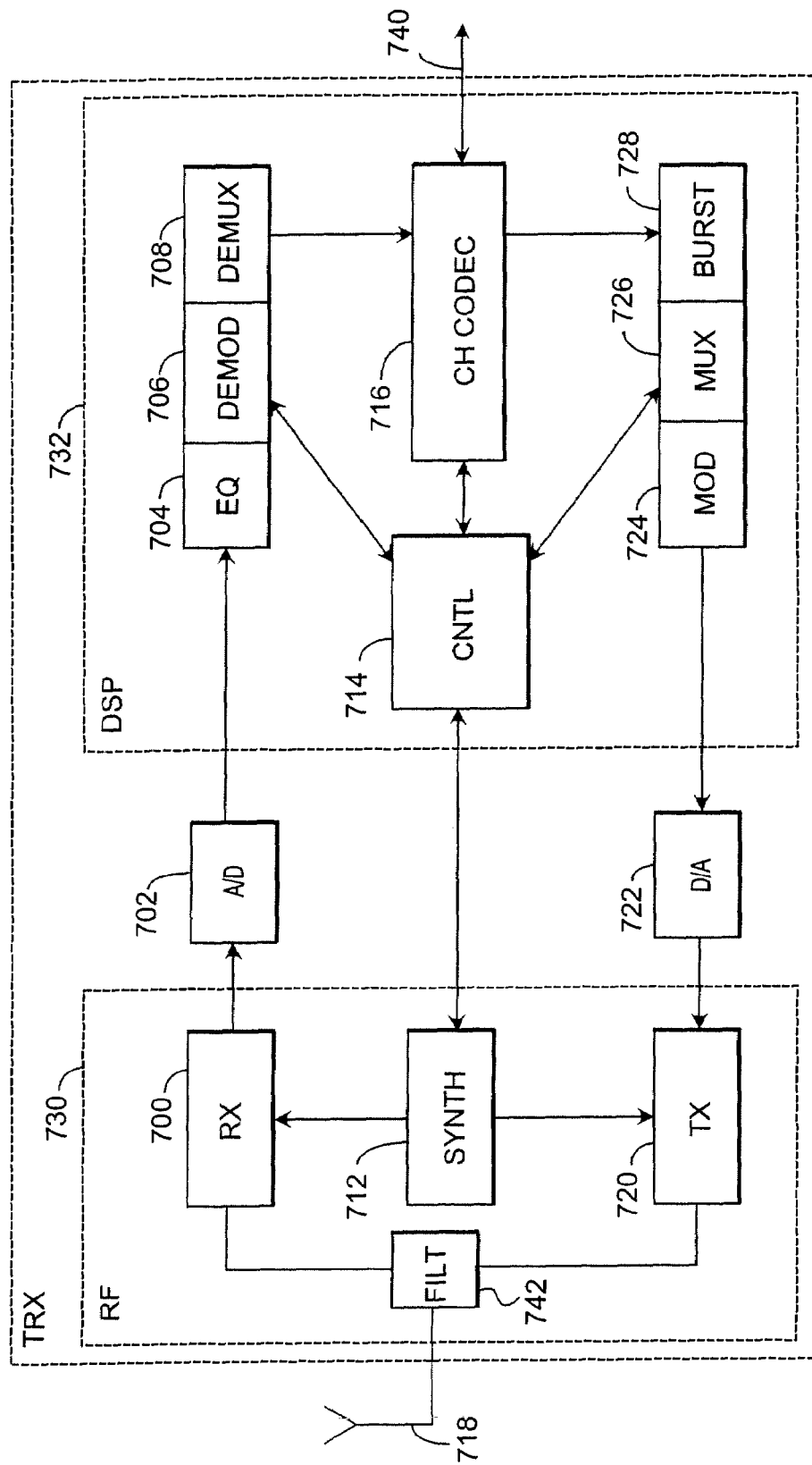

The invention is now described in closer detail in connection with the preferred embodiments and with reference to the accompanying drawings, in which FIG. 1 illustrates an above-described example according to the prior art, FIG. 2 illustrates the structure of an exemplary telecommunication system, FIG. 3 illustrates the structure of the exemplary telecommunication system in closer detail, FIG. 4 illustrates generally a CORBA architecture, FIGS. 5A and 5B illustrate a solution according to a preferred embodiment of the invention, FIG. 6 illustrates a solution according to a second preferred embodiment of the invention, and FIGS. 7 and 8 illustrate the structure of a device suitable for use in an arrangement of the invention.

DETAILED DESCRIPTION OF PREFERRED EMBODIMENTS

The present invention can be used in different radio systems wherein terminals have different radio path functions. It is, as such, irrelevant which multiple access method a system uses. For instance, CDMA, WCDMA and TDMA are possible multiple access methods. Furthermore, the system can support both circuit-switched and packet-switched connections.

Referring to FIG. 2, the structure of a UMTS mobile telephone system will be described by way of example. The main parts of the mobile telephone system are a core network CN, a UMTS terrestrial radio access network UTRAN and a terminal UE. The interface between the core network CN and the radio access network UTRAN is called Iu, and the air interface between the UTRAN and the UE is called Uu.

The terminal UE consists of two parts: Mobile equipment ME, which comprises a radio terminal used for establishing a radio connection over the Uu. A UMTS subscriber identity module USIM is a smart card which contains information on the identity of a subscriber and which typically performs identification algorithms, stores encryption parameters and subscriber information.

The UTRAN comprises radio network subsystems RNS. An RNS comprises a radio network controller RNC and one or more nodes B. In practice, node B refers to a base transceiver station. The radio network controller RNC manages radio resources at base transceiver stations connected thereto.

The core network CN consists of several parts. A home location register HLR is a database in a subscriber's home system which maintains a user service profile. The home location register also maintains information on the location of the subscriber at an accuracy of an MSC. A mobile services switching centre/visitor location register MSC/VLR is a switch MSC and a database VLR, which serves the terminal as far as circuit switched CS services are concerned. The MSC switches the circuit-switched services and the VLR maintains information on the user profile and location. A gateway MSC GMSC, in turn, is a switch connecting the UMTS to external services or networks. All circuit-switched connections pass through the GMSC. The functionality of a part called a servicing GPRS (General Packet Radio Service) support node SGSN is similar to that of the MSC/VLR except that the connections that pass through the SGSN are packet-switched PS ones. Similarly, a gateway GPRS support node GGSN is functionally similar to the GMSC as far as packet-switched connections are concerned. External networks can be divided into two types: circuit-switched networks, e.g. existing telephone networks, and packet-switched networks, such as the Internet.

The UMTS comprises a plurality of specified interfaces. The interface between the smart card USIM and the mobile equipment ME is called Cu. The radio interface between the terminal and the base transceiver station is called Uu. The interface between the core network CN and the radio access network UTRAN is called Iu. The interface between the radio network subsystems RNS is called Iur. This enables soft handovers between radio network controllers from different manufacturers. The interface between the radio network controller RNC and the base transceiver station B is called Iub.

FIG. 2 shows a rather general description, so it will be clarified by a more detailed example of a cellular radio system in FIG. 3. FIG. 3 only comprises the most relevant blocks but it is obvious to one skilled in the art that a conventional cellular radio network also comprises other functions and structures, which need not be described in closer detail herein. It is also to be noted that FIG. 3 only shows an exemplary structure. In the systems according to the invention, details may differ from those shown in FIG. 3; these differences are, however, irrelevant to the invention.

A cellular radio network thus typically comprises a fixed network infrastructure, i.e. a network part 300, and a terminal 302, which can be fixedly located, placed in a vehicle, or a portable terminal to be carried around. The network part 300 comprises base transceiver stations 304. A base transceiver station corresponds to node B in the previous figure. A radio network controller 306, in turn, controls in a centralized manner a plurality of base transceiver stations 304 connected thereto. A base transceiver station 304 is provided with transceivers 308 and a multiplexer unit 312.

The base transceiver station 304 is further provided with a control unit 310 to control the operation of the transceivers 308 and the multiplexer 312. The multiplexer is used for mapping the traffic and control channels used by several transceivers 308 in a single transmission connection 314. The transmission connection 314 constitutes the Iub interface.

The transceivers 308 of the base transceiver station 304 are connected to an antenna unit 318 for implementing a bidirectional radio connection 316 to the terminal 302. The structure of frames transmitted on the bidirectional radio connection 316 is specified system-specifically, and it is called air interface Uu. In the preferred embodiments of the invention, at least part of a signal is transmitted using three or more transmitting antennas or three or more beams obtained by means of a plurality of transmitting antennas.

The radio network controller 306 comprises a group switching field 320 and a control unit 322. The group switching field 320 is used for switching speech and data and for combining signalling circuits. The radio network subsystem 322 comprising the base transceiver station 304 and the radio network controller 306 further comprises a transcoder 324. The transcoder 324 is usually located as close to a mobile services switching centre 328 as possible since speech can thus be transmitted in a cellular radio network mode between the transcoder 324 and the radio network controller 306 using as little transmission capacity as possible.

The transcoder 324 converts the different digital speech encoding modes used between a public switched telephone network and a radio telephone network into compatible ones, e.g. from the fixed network mode into another mode of the cellular radio network, and vice versa. The control unit 322 performs call control, mobility management, collection of statistical data and signalling.

As can be seen from FIG. 3, the group switching field 320 can be used for carrying out switching procedures both to the public switched telephone network PSTN 336 through the mobile services switching centre 328 and to a packet transmission network 342.

The connection between the packet transmission network 342 and the group switching field 320 is created by a serving GPRS support node SGSN 340. The support node 340 is responsible for transmitting packets between the base transceiver system and a gateway GPRS support node GGSN 344, and for keeping a record of the location of the terminal 302 in its area.

The gateway node 344 connects a public packet transmission network 346 and the packet transmission network 342. An Internet protocol or X.25 protocol can be used at the interface. By encapsulation, the gateway node 344 hides the internal structure of the packet transmission network 342 from the public packet transmission network 346, so the packet transmission network 342 looks like a subnetwork to the public packet transmission network 346, the public packet transmission network being able to direct packets to and receive packets from the terminal 302 in the subnetwork.

The packet transmission network 342 is typically a private network which uses an Internet protocol and conveys signalling and tunnelled user data. Below the Internet protocol layer, the structure of the network 342 may vary operator-specifically both in its architecture and protocols.

The public packet transmission network 346 may be e.g. the global Internet.

Typically, time slots free from circuit-switched transmission are used for packet transmission on an air interface 316. The capacity for packet transmission is reserved dynamically, i.e. when a data transmission request is received, any free channel can be allocated for the packet transmission. The arrangement is flexible, which means that the circuit-switched connections have priority over the packet transmission connections. If necessary, circuit-switched transmission cancels out packet-switched transmission, i.e. a time slot being used by packet transmission is assigned to circuit-switched transmission. This is possible because packet transmission has a high tolerance for such interruptions: transmission simply continues using another time slot allocated for use. The arrangement can also be implemented such that circuit-switched transmission is not given any absolute priority but both the circuit-switched and packet-switched transmission requests will be served in order of arrival. These arrangements are, however, irrelevant to the present invention.

Next, let us generally view data transmission according to the CORBA architecture by means of FIG. 4. FIG. 4 shows a wireless device 400 running a software application 402. The application needs a service, e.g. information from a database, and it transmits a method call specifying the service. The device includes a second service provider application called ORB (Object Request Broker) 404, which processes the method calls of different applications. The ORB finds out the address of the service provider (suitable server) by transmitting a request 412 to a CORBA name server 414. After receiving a reply, the ORB transmits the recall to the server in question. In the case of FIG. 4, no suitable server is found under the particular ORB, so the request is transmitted using the GIOP protocol to a service provider application 408 of another device 406, which transmits the request to a suitable server 410, typically another software application, connected thereto. This server delivers a reply, which is returned to the original software application 402. The software application 402 is not, per se, aware of the location of the server but sees the rest of the environment only through the method calls. The service providers and sets of software can be implemented in different programming languages and in different hardware solutions. The parties to data transmission are verified according to the CORBA architecture in connection with the data transmission.

FIG. 5A illustrates a solution according to a preferred embodiment of the invention. The figure shows a device 500 using a wireless connection; the device can be e.g. a portable terminal in a telecommunication system, such as a mobile station either alone or connected to a portable computer. Assume in this example that the terminal has moved to a site provided with a local area network 502. The local area network can be e.g. a local area network in a room or a building, being either entirely or partly a wireless network. The wireless section of the network can be implemented by employing e.g. Bluetooth, WLAN or infrared methods or other known methods. The terminal includes means for establishing a connection to a wireless local area network. The means can be e.g. a Bluetooth transceiver, WLAN transceiver card, infrared port or the like.

The terminal 500 comprises a name server application 504 of its own and sets of software 506, 508. Assume herein that software 506 is registered in a name server so as to provide a service to other sets of software. The registration takes place according to the normal CORBA procedure, comprising the address of the software. The software 508, in turn, is registered in the name server so as to use some available service(s). The registration can take place as above, except herein, the name server registers in its database that the particular set of software is one needing a service, not providing one. The registration also comprises the address of the software. The local area network 502 also comprises a name server 510 of its own, and in this example, two sets of software 512, 514 registered in the name server such that the software 512 wishes to use some available service(s) while the software 514 provides a service to other sets of software. The registration takes place as described above.

Every now and then, the name servers poll the environment to detect new name servers. This means that they view their environment e.g. by transmitting a call request from time to time, observing whether any server replies to the call request. This can take place in a known manner dependent on the implementation of the wireless network. For instance, a Bluetooth network can employ a so-called Bluetooth Service Discovery (SDP) protocol to enable services provided by other devices to be registered in the Bluetooth protocol.

When a name server detects another name server, the name servers exchange 516 information concerning the sets of software needing a service and the sets of software providing a service. In the course of this data transmission, the name servers either exchange registration information, in which case information on the sets of software and their addresses is transmitted, or alternatively, the name servers only list references to the information to be found in another name server, in which case the actual software data is not transmitted from one server to another.

Examine FIG. 5B. Assume thus that the terminal 500 has moved into the area of the local area network 502 and that the above-described communication between the name server 504 of the terminal and the name server 510 of the local area network has taken place. For exemplary reasons, assume that the software 506 provides a service needed by the software 512, and that the software 514 provides a service needed by the software 508. Having accessed the name server of the local area network, the name server of the terminal thus detects that the service the software 508 wishes to use can be found at the name server of the network. The name server informs the software 508 that the service is available. If desired, the software 508 can now use 518 the services provided by the software 514; the name server provides the address of the particular software either directly or through the name server of the network.

Similarly, having accessed the name server 504 of the terminal, the name server 510 of the local area network thus detects that the service the software 512 wishes to use can be found at the name server of the network. The name server informs the software 512 that the service is available. If desired, the software 508 can now use 520 the services of the software 506; the name server provides the address of the particular software either directly or through the name server of the terminal.

The communication and data transmission between the sets of software can take place using method calls according to the CORBA architecture. The data transmission may naturally also include the service provider applications shown in FIG. 4, which are called ORB (Object Request Broker). The sets of software then transmit service requests and service provision information to the service provider, which communicates with the name server. The service providers are not, however, shown in the examples of FIGS. 5A and 5B.

When the connection between the name servers is disconnected, the name servers delete the information concerning the sets of software needing a service and providing a service obtained from the name server behind the disconnected connection. This can be implemented e.g. such that if the connection is not detected after a particular threshold time, it is assumed that the connection no longer exists.

FIG. 6 illustrates a solution according to a second preferred embodiment of the invention. The figure shows a device 500 using a wireless connection. The terminal 500 is provided with a name server application 504 of its own and a set of software 506. Assume in this example that the terminal has moved to a site provided with a local area network 600. The local area network comprises a gateway 602. The gateway communicates with wireless terminals using a separate CORBA protocol adapted to a wireless connection. The gateway 602 adapts the protocol used on the wireless section of a connection to the rest of the network 600. The gateway 602 communicates with a name server 604 of the local area network for the device operating in the wireless network, using the GIOP protocol. The gateway detects that a new terminal with its name server entered the area of the local area network. The gateway communicates with the name server 504 of the terminal, lists the service information found therein and transmits the information on the sets of software 606 of the network found at the name server 604 of the network to the name server of the terminal.

The advantage of the present embodiment over the previous one is that the functions according to the embodiment of the invention can be switched over to be performed by the gateway, which means that the name server does not require as many changes as a prior art local area network name server does.

FIG. 7 illustrates a structure of a device in a wireless system whereto the solution of the preferred embodiments of the invention can be applied. The device comprises an antenna 718 for transmitting and receiving signals. From the antenna, a signal is supplied to a duplex filter, which separates the transmit and receive direction signals from each other. A receiver 700 comprises a filter to block frequencies outside a desired frequency band. Next, the signal is converted into intermediate frequency or directly to base frequency, and the signal thus converted is sampled and quantized in an analogue/digital converter 702. An equalizer 704 compensates for interference, e.g. interference caused by multipath propagation. A demodulator 706 takes a bit stream from the equalized signal and delivers it to a demultiplexer 708. The demultiplexer 708 separates the bit stream from different time slots into separate logical channels. A channel codec 716 decodes the bit stream of the different logical channels, i.e. decides whether the bit stream is signalling information to be transmitted to a control unit 714 or whether the bit stream is speech to be forwarded 740 e.g. to a speech decoder. The channel codec 716 also performs error correction. The control unit 714 performs internal control tasks by controlling different units. A burst generator 728 adds a training sequence and tail bits to the data supplied from the channel codec 716. A multiplexer 726 assigns a particular time slot to each burst. A modulator 724 modulates digital signals to a radio frequency carrier wave. This function is analogue by nature, requiring a digital/analogue converter 722. A transmitter 720 comprises a filter to restrict the bandwidth. The transmitter 720 further controls the transmission output power. A synthesizer 712 arranges the necessary frequencies for the different units. A clock in the synthesizer 712 can be controlled locally. The synthesizer 712 provides the necessary frequencies using e.g. a voltage-controlled oscillator.

As shown in FIG. 7, the structure of a transceiver can be further divided into radio frequency parts 730 and digital signal processing processor with its software 732. The radio frequency parts 730 comprise the receiver 700, transmitter 720 and synthesizer 712. The digital signal processing processor with its software 732 comprises the equalizer 704, demodulator 706, demultiplexer 708, channel codes 716, control unit 714, burst generator 728, multiplexer 726 and modulator 724. The conversion of an analogue radio signal into a digital one necessitates the analogue/digital converter 702 and, similarly, the conversion of a digital signal into an analogue one necessitates the digital/analogue converter 722.

The device may further comprise user interface parts, such as a display, keypad, earpiece and a microphone. However, these are not shown in the figure. The control unit 714 of the device is typically implemented by a microprocessor or separate logic circuits including their memory elements and necessary software. The control unit is capable of executing software requiring or providing different services, as described above. The control unit is also capable of executing the software required by the service provider and the appropriate functions.

The terminal can be connected to local area networks by the equipment described above. The terminal may also comprise separate equipment for local area networks and separate, above-described equipment for the actual mobile equipment functions. The structure of the device can then be e.g. according to FIG. 8, wherein the device comprises a control unit 714, the above-described transceiver means 800, and means 802 for communicating with the local area network. These means can be e.g. a Bluetooth transceiver, WLAN transceiver card, infrared port or the like.

The preferred embodiments of the invention can also be applied when the connections between devices are established by means of a wired connection. This is exemplified e.g. by a situation wherein a terminal is arranged in a device through which a wired connection is established to a local area network through an electric power network.

Although the invention has been described above with reference to the examples according to the accompanying drawings, it is obvious that the invention is not restricted thereto but can be modified in many ways within the scope of the inventive idea disclosed in the attached claims.

The invention claimed is:

1. A method for implementing data communication between at least two sets of software used in one or more devices, at least some of the devices establishing a connection to a telecommunication system, the method comprising:
   implementing at least some of the communication between the sets of software by using service requests that include information on an address of a service provider,
   registering sets of software, that provide different services, in name servers,
   maintaining a list of the sets of software, that provide different services, and their addresses in the name servers,
   registering sets of software, that need different services, in further name servers,
   maintaining a list of the sets of software, that need different services, and their addresses in the further name servers,
   wherein the further name servers search a data transmission system for other name servers, and
   individual ones of the name servers exchange information concerning the sets of software needing a service and providing a service when the individual name servers find a new name server.

2. The method of claim 1, wherein the sets of software transmit the service requests and service provision information to a service provider, which communicates with an individual one of the name servers.

3. The method of claim 1, wherein the name server informs the software needing a service that software providing the desired service has been found at another one of the name servers.

4. The method of claim 1, wherein when a connection between the name servers is disconnected, the name servers delete the information concerning the sets of software needing a service and providing a service obtained from the name service behind the disconnected connection.

5. The method of claim 1, wherein at least a section of a connection between at least two different devices is established using a wireless connection.

6. The method of claim 5, wherein the name servers using a wireless connection poll the environment every now and then to detect new name servers.

7. The method of claim 5, wherein terminals in the telecommunication system include a name server and sets of software providing and using services.

8. The method of claim 5, wherein the sets of software providing and using services of a terminal in the telecommunication system are registered in the name server in the terminal.

9. The method of claim 5, wherein when the terminal in the telecommunication system enters the area of a new local area network, the name server of the terminal and the name server of the local area network exchange information concerning the sets of software needing a service and providing a service.

10. The method of claim 5, wherein the wireless connection is established using a Bluetooth method.

11. The method of claim 5, wherein the wireless connection is established using a WLAN method.

12. The method of claim 5, wherein the wireless connection is established using an infrared connection.

13. The method of claim 1, wherein the connection between the devices is established using a wired connection.

14. An arrangement for implementing data communication between at least two sets of software in a plurality of devices that communicate via a telecommunication system, the arrangement comprising:
   said plurality of devices, the sets of software being used in the plurality of devices, at least some of the devices including means for establishing a connection to the telecommunication system for enabling communication between the devices,
   an individual one of said devices employing service requests to accomplish at least some of the communication between the devices, the service requests including information on an address of a service provider,
   the arrangement further comprising a plurality of name servers connected to the telecommunication system for maintaining lists of sets of software providing different services and their addresses, the sets of software providing different services being registered in the plurality of name servers, and
   one or more of the name servers search the telecommunication system for other ones of the name servers and exchange information concerning the sets of software needing a service and providing a service when an individual one of the name servers finds another of the name servers.

15. The arrangement of claim 14, wherein the arrangement includes one or more service providers, and the sets of software needing a service and providing a service are arranged to transmit the service requests and service provision information to the service provider arranged to communicate with the name server.

16. The arrangement of claim 14, wherein an individual one of the name servers informs the software needing a service that software providing the desired service has been found at another one of the name servers.

17. The arrangement of claim 14, further comprising terminals in a telecommunication system, wherein the terminals include a name server and sets of software providing and using services.

18. The arrangement of claim 14, wherein the arrangement includes local area networks that include a name server and sets of software providing and using services.

19. The arrangement of claim 18, wherein the name servers of the terminals in the telecommunication system and the name server of a local area network exchange information concerning the sets of software needing a service, and provide a service when the terminal enters the area of the new local area network.

20. The arrangement of claim 14, wherein at least some of the devices include means for establishing a wireless connection to the telecommunication system.

21. The arrangement of claim 20, wherein the name servers, by use of a wireless connection, poll the environment every now and then to detect new name servers.

22. The arrangement of claim 20, further comprising terminals in the telecommunication system, the terminals including means for communicating with a local area network using a Bluetooth method.

23. The arrangement of claim 20, further comprising terminals in the telecommunication system, the terminals including means for communicating with a local area network using an infrared connection.

24. The arrangement of claim 20, further comprising terminals in the telecommunication system, the terminals including means for communicating with a local area network using a WLAN method.

25. A method for implementing data communication between at least two sets of software used in one or more devices, at least some of the devices establishing a connection to a telecommunication system that interconnects a first network and a second network, wherein a plurality of the devices are in the first network and another one or more of the devices are in the second network, the method comprising:
  implementing at least some of the communication between the sets of software by using service requests that include information on an address of a service provider,
  registering sets of software, that provide different services, in name servers, one or more of said name servers being in said first network and a further one or more of said name servers being in said second network,
  maintaining a list of the sets of software, that provide different services, and their addresses in an individual one of the name servers,
  wherein sets of software needing different services are registered in respective ones of the name servers,
  a list of the sets of software needing different services and their addresses is maintained in at least one of the name servers,
  the method further comprises searching, by the name servers of a data transmission system for other name servers, found in each of said first and said second networks, and
  exchanging, by the name servers, information concerning the sets of software needing a service and providing a service when the name servers find a new name server.

26. An arrangement for implementing data communication between at least two sets of software in a plurality of devices that communicate via a telecommunication system, the arrangement comprising:
  said plurality of devices, the sets of software being used in the plurality of devices, at least some of the devices including means for establishing a connection to the telecommunication system for enabling communication between the devices, the telecommunication system interconnecting a first network and a second network, wherein a plurality of the devices are in the first network and another one or more of the devices are in the second network,
  an individual one of said devices employing service requests to accomplish at least some of the communication between the devices, the service requests including information on an address of a service provider,
  the arrangement further comprising a plurality of name servers connected to the telecommunication system for maintaining lists of sets of software providing different services and their addresses, the sets of software providing different services being registered in the plurality of name servers, one or more of said name servers being in said first network and a further one or more of said name servers being in said second network, and
  one of more of the name servers search the telecommunication system for other ones of the name servers, found in each of said first and said second networks, said one or more of the name servers exchanging information concerning the sets of software needing a service and providing a service when an individual one of the name servers finds another of the name servers.

27. A name server useful in a data telecommunication system for implementing data communication between at least two sets of software in a plurality of devices that communicate via a telecommunication system, wherein the telecommunication system comprises:
  said plurality of devices, the sets of software being used in the plurality of devices, at least some of the devices including means for establishing a connection to the telecommunication system for enabling communication between the devices, and wherein an individual one of said devices employs service requests to accomplish at least some of the communication between the devices, the service requests including information on an address of a service provider;
  wherein said name server is one of a plurality of such name servers, each of the plurality of name servers being connected to the telecommunication system;
  wherein said name server comprises a computer and a data base operative with the computer for registration of software including an address of the software, said name server and other ones of the plurality of name servers maintaining lists of sets of software providing different services and their addresses, the sets of software providing different services being registered in the plurality of name servers; and
  said name server searches the telecommunication system for other ones of the plurality of name servers and exchanges information with the other ones of the plurality of name servers, the information concerning the sets of software needing a service and providing a service when an individual one of the name servers finds another of the name servers.

28. The name server of claim 27, wherein the name server informs the software needing a service that software providing the desired service has been found at another one of the name servers.

29. The name server of claim 27, further comprising terminals in the telecommunication system, wherein said name server resides in one of the terminals including sets of software providing and using services.

30. The name server of claim 27, further comprising a local area network in the telecommunication system, wherein said name server and sets of software providing and using services reside in said local area network.

31. A name server useful in a data telecommunication system for implementing data communication between at least two sets of software in a plurality of devices that communicate via a telecommunication system, wherein the telecommunication system comprises:

said plurality of devices, the sets of software being used in the plurality of devices, at least some of the devices including means for establishing a connection to the telecommunication system for enabling communication between the devices, the telecommunication system interconnecting a first network and a second network, wherein a plurality of the devices are in the first network and another one or more of the devices are in the second network, and wherein an individual one of said devices employing service requests to accomplish at least some of the communication between the devices, the service requests including information on an address of a service provider;

wherein said name server is one of a plurality of such name servers, each of the plurality of name servers being connected to the telecommunication system;

wherein said name server comprises a computer and a data base operative with the computer for registration of software including an address of the software, said name server and other ones of the plurality of name servers maintaining lists of sets of software providing different services and their addresses, the sets of software providing different services being registered in the plurality of name servers, said name server being in said first network and another of said plurality of name servers being in said second network; and said name server searches the telecommunication system for other ones of the plurality of name servers, found in each of said first and said second networks, and exchanges information with the other ones of the plurality of name servers, the information concerning the sets of software needing a service and providing a service when an individual one of the name servers finds another of the name servers.

32. The name server of claim 31, wherein the name server informs the software needing a service that software providing the desired service has been found at another one of the name servers.

33. The name server of claim 31, further comprising terminals in the telecommunication system, wherein said name server resides in one of the terminals including sets of software providing and using services.

34. The name server of claim 31, further comprising a local area network in the telecommunication system, wherein said name server and sets of software providing and using services reside in said local area network.

\* \* \* \* \*